United States Patent
Koga

(10) Patent No.: US 11,592,803 B2
(45) Date of Patent: Feb. 28, 2023

(54) STORAGE MEDIUM, CONTROL APPARATUS, AND CONTROL METHOD

(71) Applicant: FUJITSU LIMITED, Kawasaki (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 50 days.

(21) Appl. No.: 17/016,707

(22) Filed: Sep. 10, 2020

(65) Prior Publication Data

US 2021/0096539 A1    Apr. 1, 2021

(30) Foreign Application Priority Data

Sep. 30, 2019  (JP) .............................. JP2019-179659

(51) Int. Cl.
  *G05B 19/4155*  (2006.01)
(52) U.S. Cl.
  CPC ................ *G05B 19/4155* (2013.01); *G05B 2219/34348* (2013.01)
(58) Field of Classification Search
  None
  See application file for complete search history.

(56) References Cited

U.S. PATENT DOCUMENTS

| 8,428,777 B1* | 4/2013 | Poursohi .......... G05B 19/41865 700/248 |
| 2010/0217438 A1* | 8/2010 | Kawaguchi .......... G05D 1/0217 700/248 |
| 2013/0055276 A1* | 2/2013 | Park ...................... G06F 9/4887 718/103 |
| 2014/0026144 A1* | 1/2014 | Pack ...................... G06F 9/505 718/105 |
| 2017/0001308 A1* | 1/2017 | Bataller ............. G05B 19/0423 |
| 2017/0252926 A1* | 9/2017 | Wise ...................... B25J 9/1669 |
| 2018/0001473 A1* | 1/2018 | Yoshiuchi .............. B25J 9/1602 |
| 2018/0239651 A1* | 8/2018 | Gong .................. G06F 12/0813 |
| 2018/0284760 A1* | 10/2018 | Gupta ................... B25J 13/065 |

FOREIGN PATENT DOCUMENTS

| JP | 7-160615 A | 6/1995 |
| JP | 10-105497 A | 4/1998 |

* cited by examiner

*Primary Examiner* — Mohammad Ali
*Assistant Examiner* — David Earl Ogg
(74) *Attorney, Agent, or Firm* — WHDA, LLP

(57) ABSTRACT

A non-transitory computer-readable storage medium storing a program that causes a computer to execute a process, the process includes acquiring information in a log regarding an operating state of a plurality of robots; based on the acquired information in the log, calculating a first load in each time slot related to control of the plurality of robots; when there is a first time slot in which the first load is higher than or equal to a first threshold, extracting a robot that performs a first task, from the plurality of robots, in the first time slot; and changing a time slot for operating the extracted robot.

9 Claims, 19 Drawing Sheets

FIG. 6

| ROBOT ID | ROBOT TYPE | SCHEDULE | PREVIOUS EXECUTION TIME POINT | EXECUTION STATE | EXECUTION TIME PERIOD AVERAGE (SEC) |
|---|---|---|---|---|---|
| 1 | MANUAL EXECUTION | - | 20xx/01/05 13:05 | OFF | 30 |
| 2 | MANUAL EXECUTION | - | 20xx/01/05 16:00 | ON | 120 |
| 3 | AUTOMATIC EXECUTION | 13:00 | 20xx/01/05 13:00 | OFF | 600 |
| 4 | AUTOMATIC EXECUTION | 0:15 | 20xx/01/05 00:15 | OFF | 1500 |

FIG. 7

| ROBOT ID | LOG ID | LOG MESSAGE |
|---|---|---|
| 1 | 1 | "'message' : 'Robot started.' 'timestamp' : '20xx/01/05 13:05 00:00'" |
| 1 | 2 | "'message' : 'Robot finished.' 'timestamp' : '20xx/01/05 13:05 30:00'" |
| 2 | 3 | "'message' : 'Robot started.' 'timestamp' : '20xx/01/05 16:00 00:00'" |
| 2 | 4 | "'message' : 'Robot finished.' 'timestamp' : '20xx/01/05 16:02 00:00'" |
| 3 | 5 | "'message' : 'Robot started.' 'timestamp' : '20xx/01/05 13:00 00:00'" |
| 3 | 6 | "'message' : 'Robot finished.' 'timestamp' : '20xx/01/05 13:10 00:00'" |
| 4 | 7 | "'message' : 'Robot started.' 'timestamp' : '20xx/01/05 00:15 00:00'" |
| 4 | 8 | "'message' : 'Robot finished.' 'timestamp' : '20xx/01/05 00:30 00:00'" |

FIG. 8

| ROBOT ID | CANDIDATE 1 | CANDIDATE 2 | CANDIDATE 3 |
|---|---|---|---|
| 1 | 20xx/01/06 13:10 | 20xx/01/06 13:15 | 20xx/01/06 14:00 |
| 2 | 20xx/01/06 16:00 | 20xx/01/06 16:01 | 20xx/01/06 16:02 |

FIG. 9

| ROBOT ID | EXECUTION START TIME POINT | EXECUTION END TIME POINT |
|---|---|---|
| 1 | 20xx/01/06 13:00 00:05 | 20xx/01/06 13:00 00:35 |
| 2 | 20xx/01/06 16:00 00:10 | 20xx/01/06 16:02 00:10 |

FIG. 10

| ROBOT ID | CANDIDATE 1 | CANDIDATE 2 | CANDIDATE 3 |
|---|---|---|---|
| 1 | 20xx/01/06 13:10 | 20xx/01/06 13:15 | 20xx/01/06 14:00 |

| ROBOT ID | CANDIDATE 1 | CANDIDATE 2 | CANDIDATE 3 |
|---|---|---|---|
| 2 | 20xx/01/06 16:00 | 20xx/01/06 16:01 | 20xx/01/06 16:02 |

FIG. 11

| ROBOT ID | LOG ID | LOG MESSAGE |
|---|---|---|
| 1 | 1 | "'message' : 'Robot started.' 'timestamp' : '20xx/01/05 13:05 00:00'" |
| 1 | 2 | "'message' : 'Robot finished.' 'timestamp' : '20xx/01/05 13:05 30:00'" |

| ROBOT ID | LOG ID | LOG MESSAGE |
|---|---|---|
| 2 | 3 | "'message' : 'Robot started.' 'timestamp' : '20xx/01/05 16:00 00:00'" |
| 2 | 4 | "'message' : 'Robot finished.' 'timestamp' : '20xx/01/05 16:02 00:00'" |

| ROBOT ID | LOG ID | LOG MESSAGE |
|---|---|---|
| 3 | 5 | "'message' : 'Robot started.' 'timestamp' : '20xx/01/05 13:00 00:00'" |
| 3 | 6 | "'message' : 'Robot finished.' 'timestamp' : '20xx/01/05 13:10 00:00'" |

| ROBOT ID | LOG ID | LOG MESSAGE |
|---|---|---|
| 4 | 7 | "'message' : 'Robot started.' 'timestamp' : '20xx/01/05 00:15 00:00'" |
| 4 | 8 | "'message' : 'Robot finished.' 'timestamp' : '20xx/01/05 00:30 00:00'" |

STORAGE MEDIUM, CONTROL APPARATUS, AND CONTROL METHOD

CROSS-REFERENCE TO RELATED APPLICATION

This application is based upon and claims the benefit of priority of the prior Japanese Patent Application No. 2019-179659, filed on Sep. 30, 2019, the entire contents of which are incorporated herein by reference.

FIELD

The embodiment discussed herein is related to a storage medium, a control apparatus, and a control method.

BACKGROUND

The upper limit to the number of robots that may be registered in each robotic process automation (RPA) server is about 100 to 1000 and depends on the specifications of the server machine. Therefore, many (for example, 1000 or more) of the same robots are not able to be monitored by the same server.

For example, after creating about 100 robots prior to construction of an RPA server and manually operating the robots for a certain time period (for example, about half a year), adding 100 robots may pose an operational obstacle to the management of robots. Examples of the related art are disclosed in Japanese Laid-open Patent Publication No. 7-160615 and Japanese Laid-open Patent Publication No. 10-105497.

SUMMARY

According to an aspect of the embodiments, a non-transitory computer-readable storage medium storing a program that causes a computer to execute a process, the process includes acquiring information in a log regarding an operating state of a plurality of robots; based on the acquired information in the log, calculating a first load in each time slot related to control of the plurality of robots; when there is a first time slot in which the first load is higher than or equal to a first threshold, extracting a robot that performs a first task, from the plurality of robots, in the first time slot; and changing a time slot for operating the extracted robot.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 exemplarily illustrates a robot management table in the server illustrated in FIG. 1;

FIG. 7 exemplarily illustrates a log management table in the server illustrated in FIG. 1;

FIG. 8 exemplarily illustrates a candidate execution time point management table in the server illustrated in FIG. 1;

FIG. 9 exemplarily illustrates an execution time management table in the server illustrated in FIG. 1;

FIG. 10 exemplarily illustrates candidate execution time point management tables in a user machine and a virtual machine (VM) illustrated in FIG. 1;

FIG. 11 exemplarily illustrates log management tables in user machines and VMs illustrated in FIG. 1;

DESCRIPTION OF EMBODIMENTS

Figure 1:
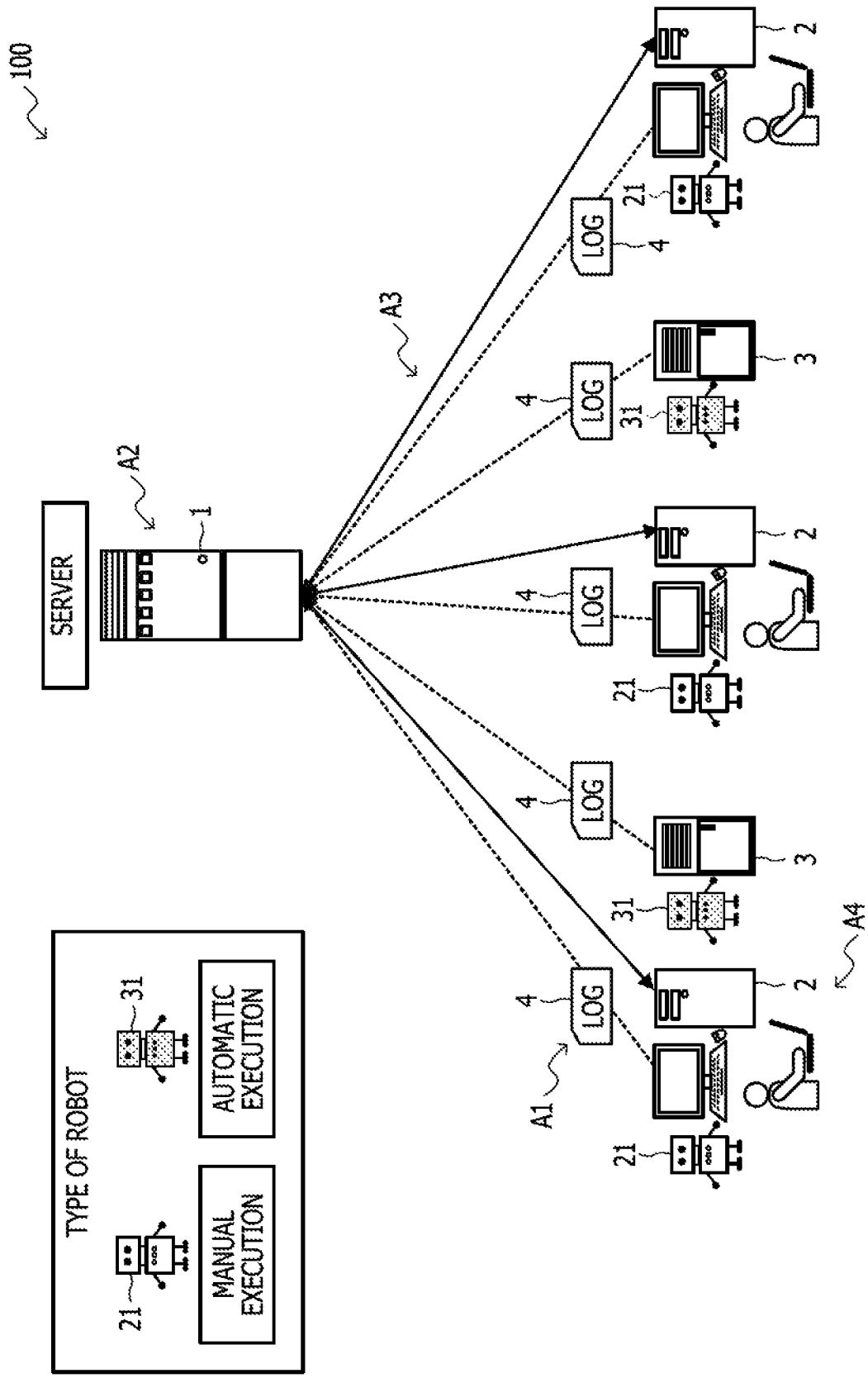
FIG. 1 schematically illustrates an example of a configuration of an exemplary control system according to an embodiment.

It is conceivable that management is performed by a plurality of servers. However, as the number of servers increases, the management of the registration state and operating state (for example, whether or not operations are being performed, an error state, and monitoring of execution logs) of robots performed by the system administrator becomes complicated.

In view of the above, it is desirable that the load related to a server that performs a control process of the plurality of robots be temporally distributed.

Hereinafter, an embodiment is described with reference to the accompanying drawings. The following embodiment is merely exemplary and is in no way intended to exclude various modifications and technical applications that are not explicitly described in the embodiment. For example, the present embodiment may be carried out in various modified forms without departing from the spirit and scope of the present embodiment.

Each drawing is not intended to include only components illustrated in the drawing but may include other functions and the like.

The same reference characters denote substantially the same components in the drawings, and the description thereof is omitted.

[A] Example of Embodiment

[A-1] Example of System Configuration

FIG. 1 schematically illustrates an example of a configuration of an exemplary control system 100 according to an embodiment.

As illustrated in FIG. 1, the control system 100 includes a server 1, a plurality of (three in the illustrated example) user machines 2, and a plurality of (two in the illustrated example) virtual machines (VM) 3.

The server 1 is, for example, an RPA server and a computer (for example, a control apparatus) having server functionality. The server 1 is communicably coupled to the user machines 2 and the VMs 3.

The user machine 2 is a device provided to a user, and a manual execution robot 21 is deployed to the user machine 2.

An automatic execution robot 31 is deployed to the VM 3.

The manual execution robot 21 and the automatic execution robot 31 may hereafter be collectively referred to as a robot 21, 31.

The outline of a load balancing process in the control system 100 will be described below.

As denoted by reference character A1, the server 1 collects logs 4 from the user machines 2 and the VMs 3.

As denoted by reference character A2, the server 1 calculates the operating state of the robots 21, 31. For example, the server 1 calculates the operating state of the manual execution robots 21 and the automatic execution robots 31, and summarizes the execution schedules of the automatic execution robots 31 and the scheduled execution time points of the manual execution robots 21 for notifying the users.

In calculating the operating state in the server 1, the execution schedules (for example, in scheduling such as "execution at XX:YY daily, weekly, and monthly") of the automatic execution robots 31 registered in the server 1 are compared with the execution states (for example, indicating how many robots are executed in which time slots) of the manual execution robots 21). Thereby, the server load state in each time slot is calculated, which enables users to be contacted with a time slot and the date and time when a high or low load state is indicated.

As denoted by reference character A3, the server 1 notifies each user machine 2 of the execution states of the other robots 21, 31.

As denoted by reference character A4, the user confirms the operating state of which the user has been notified, and performs operations so as to execute the manual execution robot 21 in a time slot in which the server load is low.

Methods of displaying the execution states of the robots 21, 31 on the user machine 2 include, in addition to directly displaying data indicating how high or low the load information is, for example, a method of processing data into a graph, a table, or the like and displaying the graph, the table, or the like.

At the stage where the user machine 2 is notified of the operating state, if the previous execution time slot of the manual execution robot 21 of the user matches a time slot in which the server load is high, the user may be notified of the match and be prompted to reduce the server load.

The user may select a scheduled execution time point from candidate execution time points or input a scheduled execution time point. In this case, the server 1 receives the scheduled execution time point. If the scheduled execution time point that will lead to a high server load is specified, the server 1 may reschedule the execution of the automatic execution robots 31 so that the server load will be lower than or equal to a threshold.

The processing denoted by reference characters A2 and A3 is not limited to the functionality of an RPA server. Instead, an agent that transmits and receives data and performs calculations may be provided in a machine where the RPA server is installed, and the agent may execute the processing.

Figure 2:
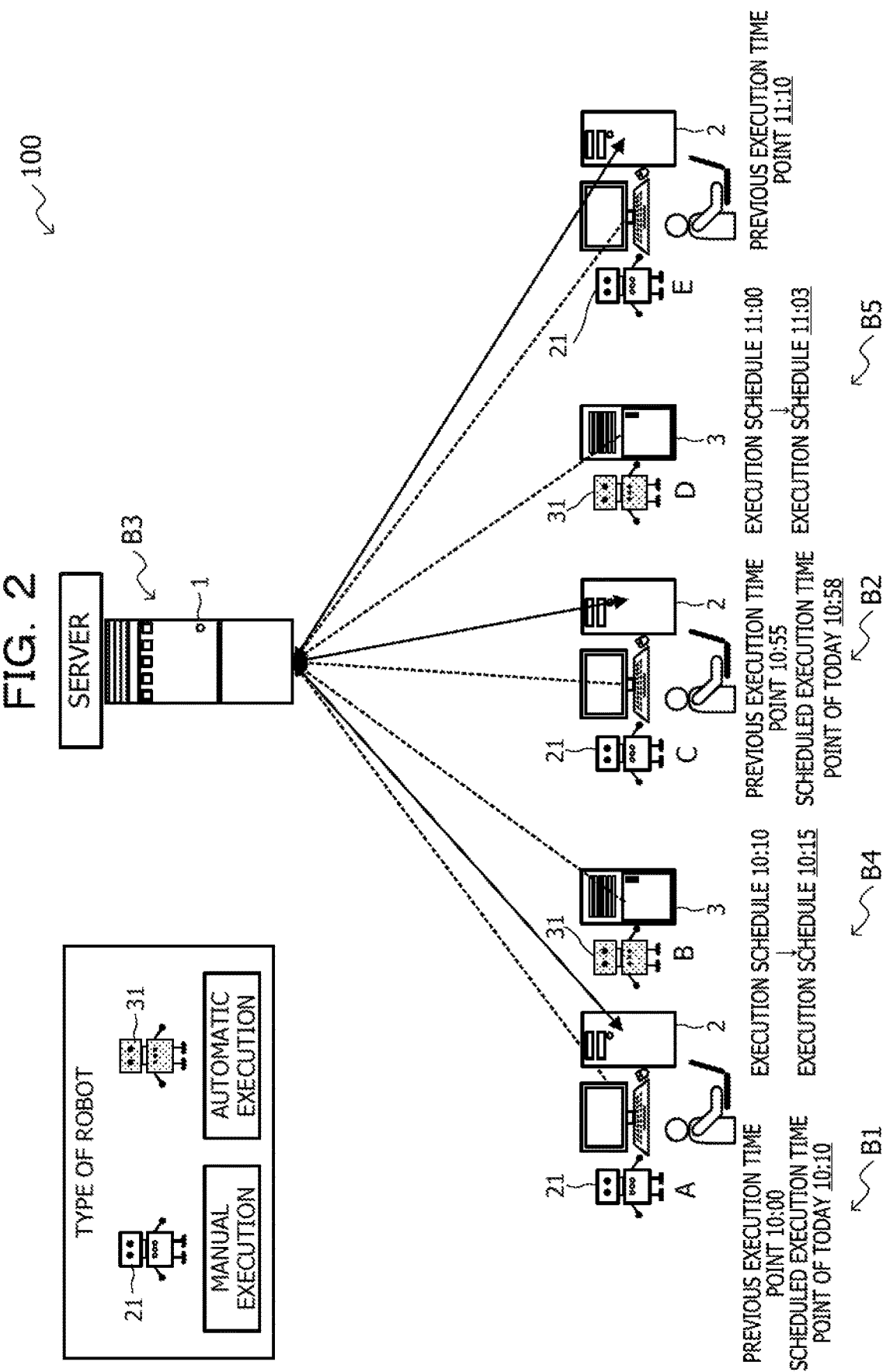
FIG. 2 is an illustration for explaining a process of rescheduling execution time points of automatic execution robots in the control system illustrated in FIG. 1.

FIG. 2 is an illustration for explaining a process of rescheduling execution time points of the automatic execution robots 31 in the control system 100 illustrated in FIG. 1.

In the example illustrated in FIG. 2, as denoted by reference character B1, the scheduled execution time point of today of the manual execution robot A is set to "10:10", and, as denoted by reference character B2, the scheduled execution time point of today of the manual execution robot C is set to "10:58". It is assumed that the time period taken to complete execution of each robot 21, 31 is 5 minutes.

As denoted by reference character B3, the server 1 compares the scheduled execution time points of today of which the server 1 has been notified by the manual execution robots 21 (the manual execution robots A and C in the illustrated example), with the execution schedules of the automatic execution robots 31. In the illustrated example, the execution time slots of the manual execution robot A and the automatic execution robot B overlap, and the execution time slots of the manual execution robot C and the automatic execution robot D overlap.

Therefore, as denoted by reference character B4, the server 1 reschedules the execution schedule of the automatic execution robot B from "10:10" to "10:15", and, as denoted by reference character B5, reschedules the execution schedule of the automatic execution robot D from "11:00" to "11:03".

Figure 3:
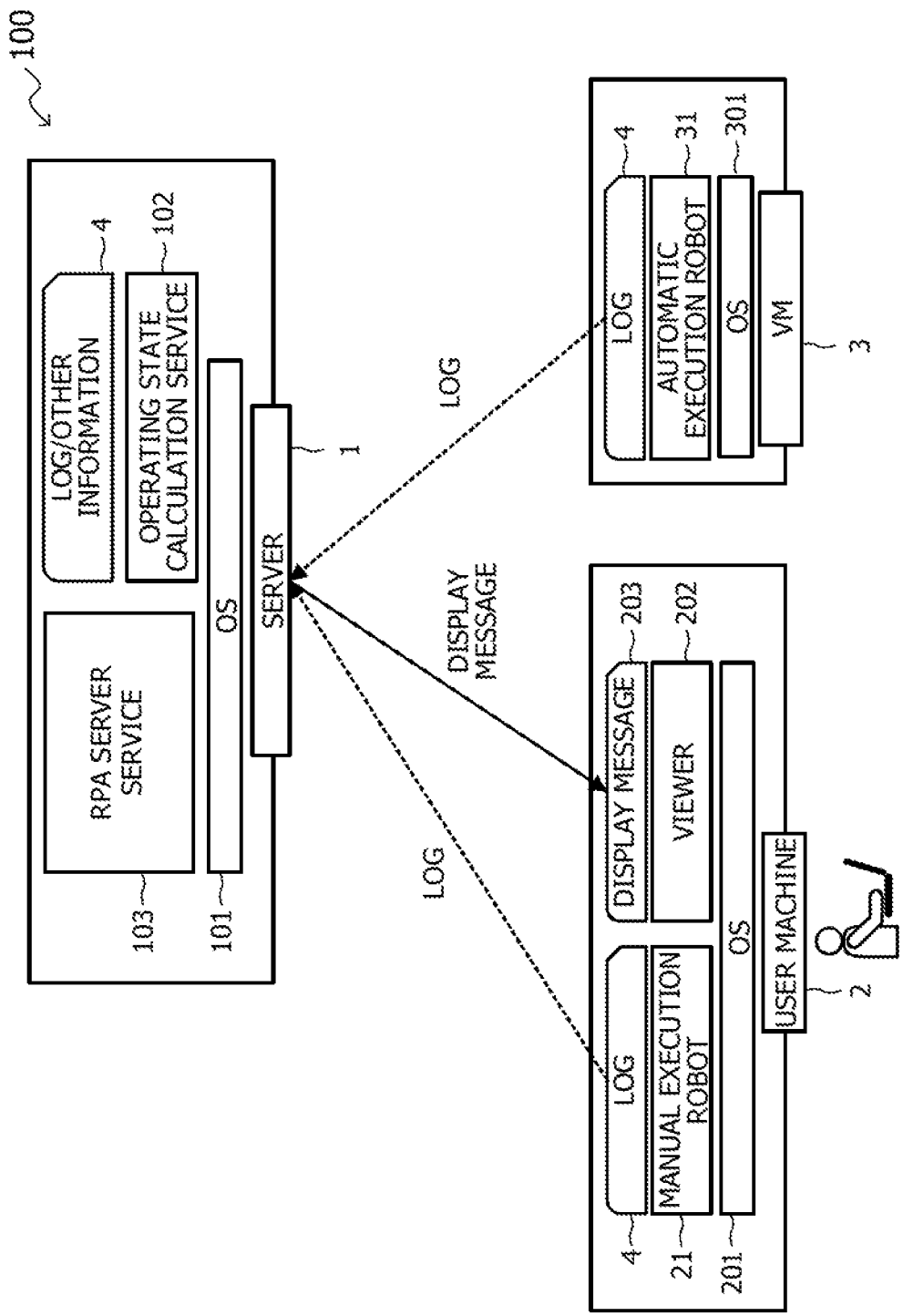
FIG. 3 is a block diagram schematically illustrating an example of a software configuration of the control system illustrated in FIG. 1.

FIG. 3 is a block diagram schematically illustrating an example of a software configuration of the control system 100 illustrated in FIG. 1.

In the server 1, an operating state calculation service 102 and an RPA server service 103 are deployed on an operating system (OS) 101. The operating state calculation service 102 calculates the operating state of the robots 21, 31 and manages the logs 4 acquired from the user machines 2 and the VMs 3 and other information. The RPA server service 103 manages the user machines 2 and the VMs 3.

In the user machine 2, the manual execution robot 21 and a viewer 202 are deployed on an OS 201. The manual execution robot 21 manages information about the log 4. The viewer 202 manages a display message 203 transmitted from the server 1.

In the VM 3, the automatic execution robot 31 is deployed on an OS 301. The automatic execution robot 31 manages information about the log 4.

Figure 4:
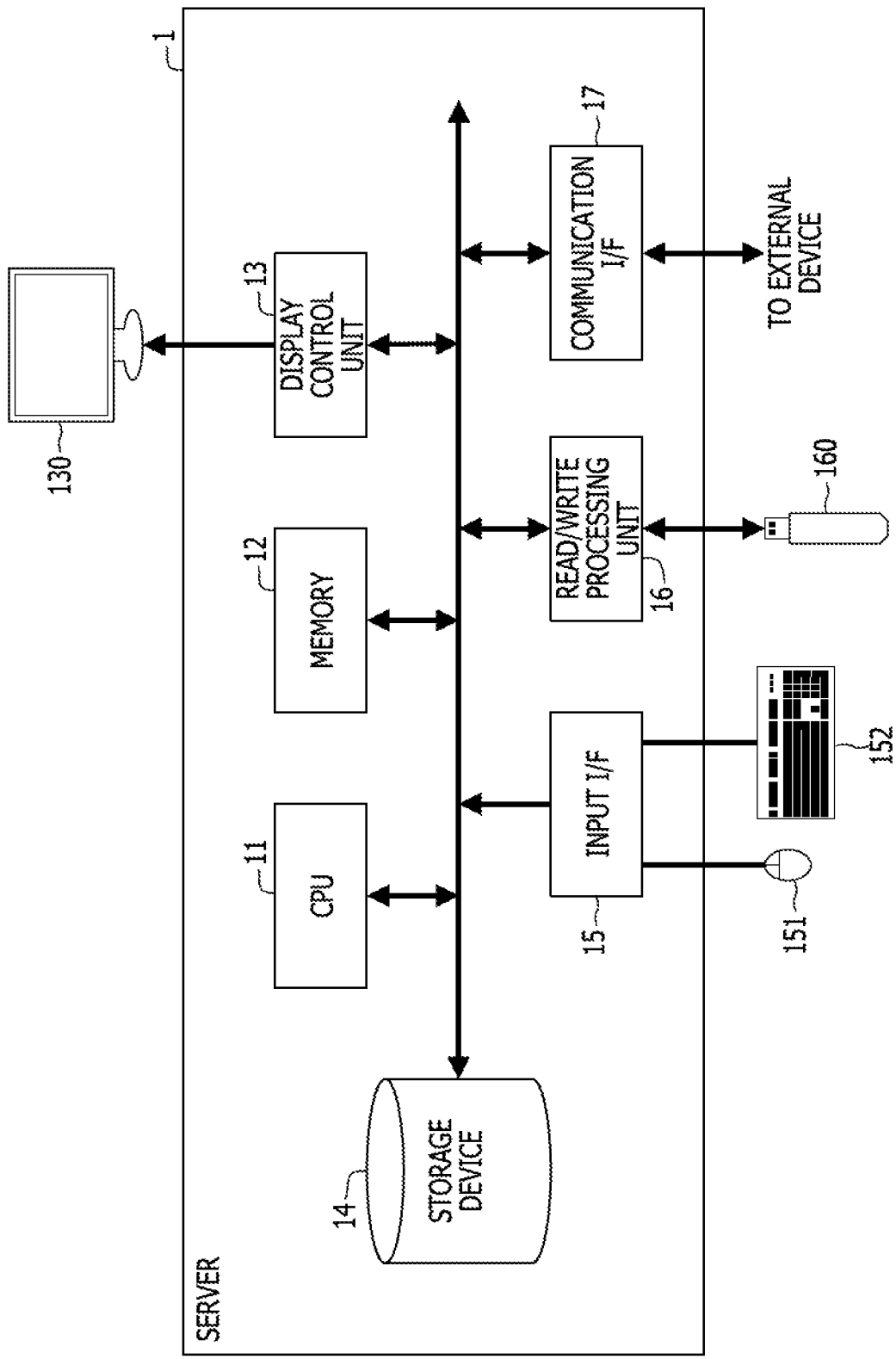
FIG. 4 is a block diagram schematically illustrating an example of a hardware configuration of a server illustrated in FIG. 1.

FIG. 4 is a block diagram schematically illustrating an example of a hardware configuration of the server 1 illustrated in FIG. 1.

As illustrated in FIG. 4, the server 1 includes a central processing unit (CPU) 11, a memory 12, a display control unit 13, a storage device 14, an input interface (I/F) 15, a read/write processing unit 16, and a communication I/F 17.

The memory 12 is an example of a storage unit and is, for example, a storage device including a read-only memory (ROM) and a random-access memory (RAM). A program, such as a basic input and output system (BIOS), may be written to the ROM of the memory 12. The software program in the memory 12 may be appropriately read into and executed by the CPU 11. The RAM of the memory 12 may be used as a primary recording memory or a working memory.

The display control unit 13 is coupled to a display device 130 and controls the display device 130. The display device 130 is a liquid crystal display, an organic light-emitting diode (OLED) display, a cathode ray tube (CRT), an electronic paper display, or the like and displays various types of information to an operator or the like. The display device 130 may be combined with an input device and, for example, may be a touch panel.

The storage device 14 is, by way of example, a device that reads and writes data and stores the data, and, for example, a hard disk drive (HDD), a solid-state drive (SSD), or a storage class memory (SCM) may be used.

The input I/F 15 may be coupled to input devices, such as a mouse 151 and a keyboard 152, to control the input devices, such as the mouse 151 and the keyboard 152. The mouse 151 and the keyboard 152 are exemplary input devices. The operator performs various input operations via these input devices.

A recording medium 160 may be attached to the read/write processing unit 16. When the recording medium 160 is attached to the read/write processing unit 16, the read/write processing unit 16 may read information recorded on the recording medium 160. In this example, the recording medium 160 has portability. For example, the recording medium 160 is a floppy disk, an optical disk, a magnetic disk, a magneto-optical disk, a semiconductor memory, or the like.

The communication I/F 17 is an interface that enables communication with an external device.

The CPU 11 is a processing unit that performs various types of control and executes computations. The CPU 11 implements various functions by executing the OS and programs stored in the memory 12.

A device for controlling the operations of the entire server 1 is not limited to the CPU 11 but may be, for example, any one of a MPU, a DSP, an ASIC, a PLD, and an FPGA. The device for controlling the entire operations of the server 1 may be a combination of two or more of the CPU, the MPU, the DSP, the ASIC, the PLD, and the FPGA. The MPU is an abbreviation for microprocessor unit, the DSP is an abbreviation for digital signal processor, and the ASIC is an abbreviation for application-specific integrated circuit. The PLD is an abbreviation for programmable logic device, and the FPGA is an abbreviation for field-programmable gate array.

Figure 5:
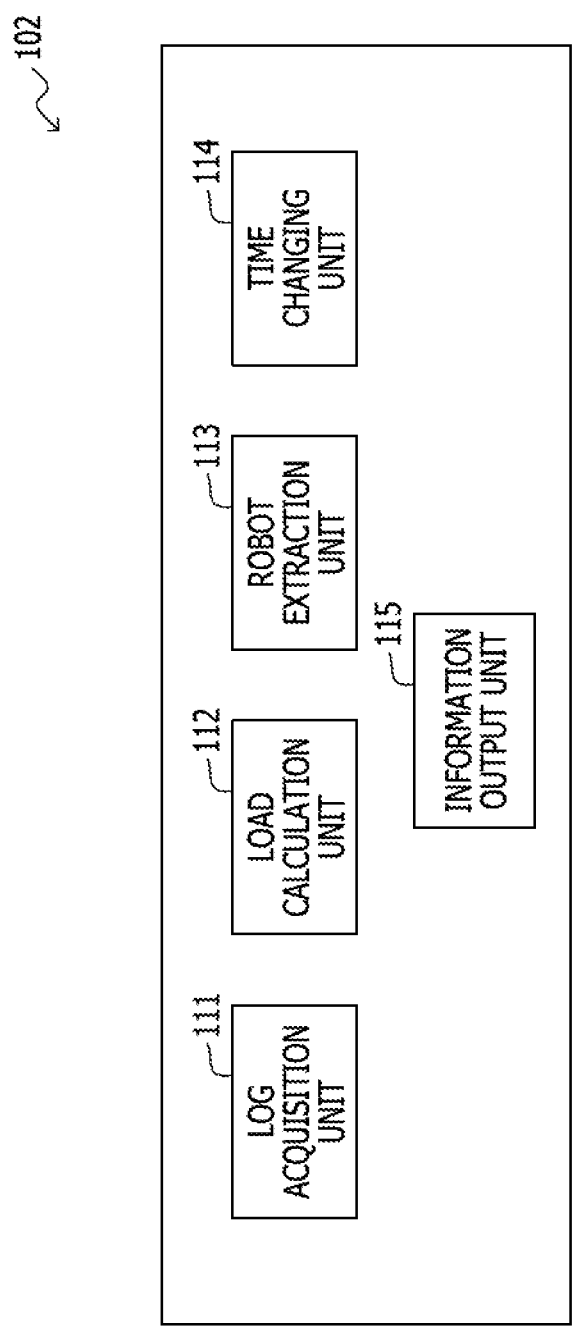
FIG. 5 is a block diagram schematically illustrating an example of a software configuration of the server illustrated in FIG. 1.

FIG. 5 is a block diagram schematically illustrating an example of a software configuration of the server 1 illustrated in FIG. 1.

In the operating state calculation service 102 illustrated in FIG. 3, the server 1 includes functions as a log acquisition unit 111, a load calculation unit 112, a robot extraction unit 113, a time changing unit 114, and an information output unit 115.

The log acquisition unit 111 acquires information in the logs 4 regarding the operating state of a plurality of robots 21, 31.

Based on the acquired information in the logs 4, the load calculation unit 112 calculates a first load in each time slot related to control of the plurality of robots 21, 31. The load calculation unit 112 may calculate a second load in a second time slot when a change to the second time slot is made.

When there is a first time slot in which the first load is higher than or equal to a first threshold, the robot extraction unit 113 extracts the robot 21, 31 that performs a first task, from the plurality of robots 21, 31, in the first time slot. The robot extraction unit 113 may determine the first task depending on whether a task is performed by a user who uses the robot 21, 31.

The time changing unit 114 changes a time slot for operating the extracted robot 21, 31.

After calculation of the operating state of the robots 21, 31, the time changing unit 114 may shift the schedule of the automatic execution robot 31 to a time slot in which the server load is low. For example, in cases where the execution time point of the automatic execution robot 31 may be shifted into a time slot during which the user is absent, the time changing unit 114 shifts the execution time point of the automatic execution robot 31 into a late-night time slot. For example, the time changing unit 114 may change the time slot for operating the extracted robot 21, 31 to the second time slot in which the first load is lowest.

Prior to transmitting the calculation data of a load state to a user, the time changing unit 114 may shift the schedule of the automatic execution robot 31. When the server load is unable to be reduced only by the schedule shift of the automatic execution robot 31, the time changing unit 114 may create data for notifying the user to change the execution time slot of the manual execution robot 21, and transmit the data to the user. Thus, both the user and the server 1 reduce the load. For example, the time changing unit 114 may determine, depending on the calculated second load, whether to execute changing of the time slot for operating the robot 21, 31.

The information output unit 115 may display a list of candidate execution time points of the manual execution robot 21 of the user, in addition to the operating state acquired by the user from the server 1. When the user selects a scheduled execution time point from the list of candidate execution time points, the server 1 may receive the selected scheduled execution time point. Based on the received scheduled execution time point, the execution information of the manual execution robots 21 of the other users calculated in advance, and the schedule information of the automatic execution robots 31 registered in the server 1, the server 1 may calculate the server load state at the scheduled execution time point. When the calculated server load state is at or above a threshold, the server 1 may change the scheduled execution time point or the schedule of the robot 21, 31 registered in the server 1 so that the server load is lower than or equal to the threshold, thereby enabling the server load to be reduced. For example, when the second load is in a certain state, the information output unit 115 may output information on a load in at least a partial time slot included in each time slot.

FIG. 6 exemplarily illustrates a robot management table in the server 1 illustrated in FIG. 1.

Information about the robot management table is stored in the storage device 14 of the server 1, and a robot ID, a robot type, a schedule, a previous execution time point, an execution state, and an execution time period average are associated with one another.

The robot ID is an identifier for uniquely identifying the robot 21, 31. The robot type indicates whether the robot of interest is the manual execution robot 21 or the automatic execution robot 31. The schedule indicates a time point at which the robot 21, 31 is to be executed next time. The previous execution time point indicates a time point at which the robot 21, 31 was executed previously. The execution state indicates whether the robot 21, 31 is currently being executed (ON) or not being executed (OFF). The execution time period average indicates an average time period taken for one execution of the robot 21, 31.

FIG. 7 exemplarily illustrates a log management table in the server 1 illustrated in FIG. 1.

Information about the log management table is stored in the storage device 14 of the server 1, and a robot ID, a log ID, and a log message are associated with one another.

The robot ID is an identifier for uniquely identifying the robot 21, 31. The log ID is an identifier for uniquely identifying the log 4. The log message indicates the content of the log 4.

FIG. 8 exemplarily illustrates a candidate execution time point management table in the server 1 illustrated in FIG. 1.

Information about the candidate execution time point management table is stored in the storage device 14 of the server 1, and a robot ID and one or more (three in the illustrated example) candidate execution time points (denoted by "CANDIDATE" in the drawing) are associated with each other.

The robot ID is an identifier for uniquely identifying the robot 21, 31. The candidate execution time points represent candidate execution time points of the manual execution robot 21 presented to the user. The user selects any candidate execution time point.

FIG. 9 exemplarily illustrates an execution time management table in the server 1 illustrated in FIG. 1.

Information about the execution time management table is stored in the storage device 14 of the server 1, and a robot ID, an execution start time point, and an execution end time point are associated with one another.

The robot ID is an identifier for uniquely identifying the robot 21, 31. The execution start time point indicates a time point at which execution of the robot 21, 31 was started. The execution end time point represents a time point at which execution of the robot 21, 31 was completed.

FIG. 10 exemplarily illustrates candidate execution time point management tables in the user machine 2 and the VM 3 illustrated in FIG. 1.

Information about the candidate execution time point management table is stored in storage devices (not illustrated) of the user machine 2 and the VM 3. As in the example illustrated in FIG. 8, a robot ID and one or more (three in the illustrated example) candidate execution time points (denoted by "CANDIDATE" in the drawing) are associated with each other. The user machine 2 and the VM 3 separately manage the candidate execution time point management tables.

FIG. 11 exemplarily illustrates log management tables in the user machines 2 and the VMs 3 illustrated in FIG. 1.

Information about the log management tables is stored in storage devices (not illustrated) of the user machines 2 and the VMs 3. As in the example illustrated in FIG. 7, a robot ID, a log ID, and a log message are associated with one another.

Figure 12:
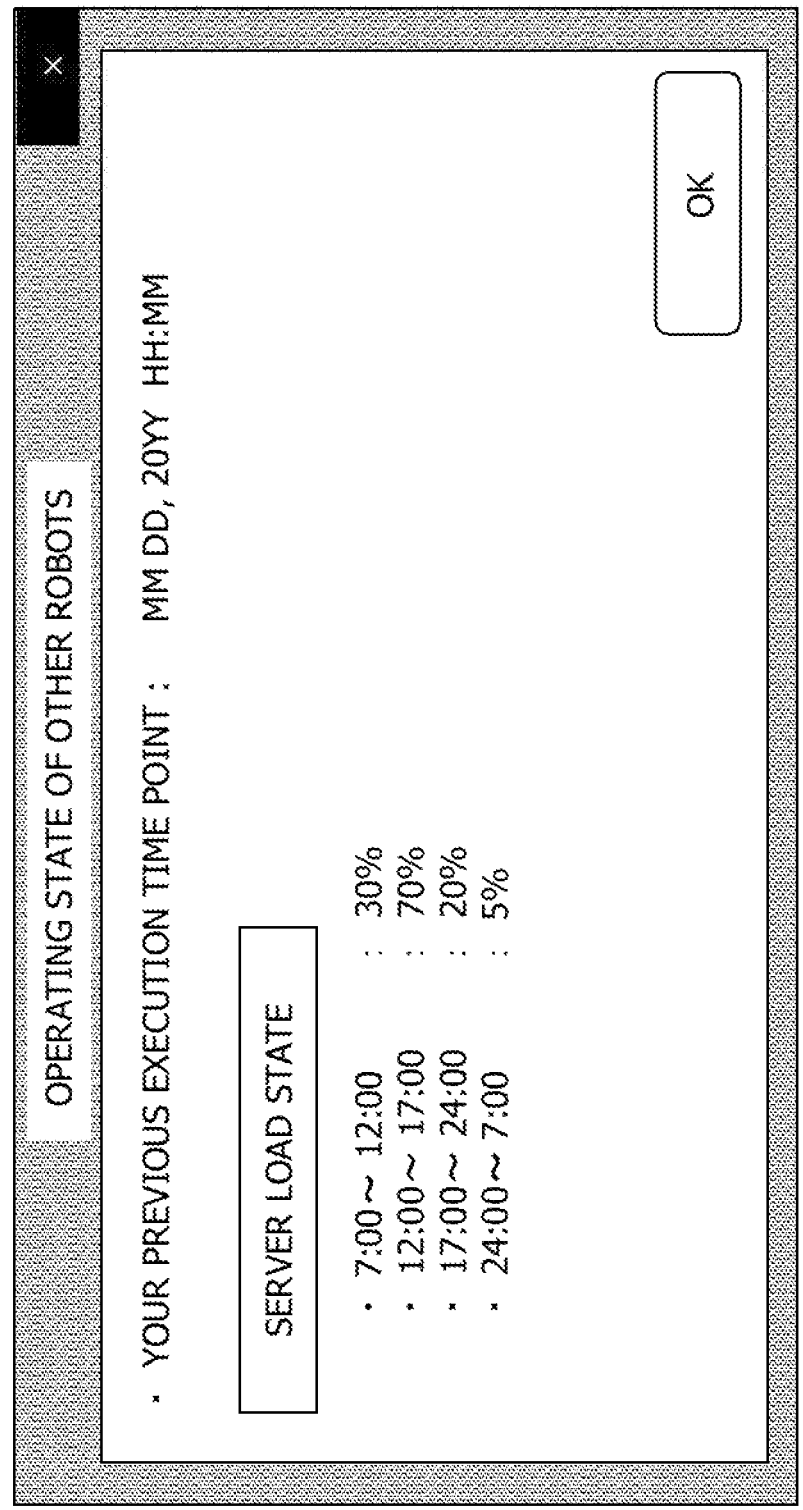
FIG. 12 illustrates an example of an output of a warning dialog in the control system illustrated in FIG. 1.

FIG. 12 illustrates an example of an output of a warning dialog in the control system 100 illustrated in FIG. 1.

In the example illustrated in FIG. 12, the operating state of the robots 21, 31 denoted by reference character A4 in FIG. 1 is illustrated as a server load state. In the server load state, the utilization percentage of resources in the control system 100 may be indicated in each time slot.

A user references the warning dialog illustrated in FIG. 12 and causes the manual execution robot 21 to be executed in any time slot in which the load is low.

The server load state is represented as a percentage in the illustrated example but is not limited to this. For example, assuming that the number of robots 21, 31 registered in the control system 100 is a denominator, the number of robots 21, 31 that are being executed may be displayed as a numerator. For example, in the case where 50 robots 21, 31 are registered and 15 robots 21, 31 among them are being executed, the server load state may be displayed as "15/50".

In the illustrated example, each time slot for aggregating loads, which is displayed in the server load state, is 4 hours. However, each time slot for aggregating loads is not limited to this but any time slot may be set.

Figure 13:
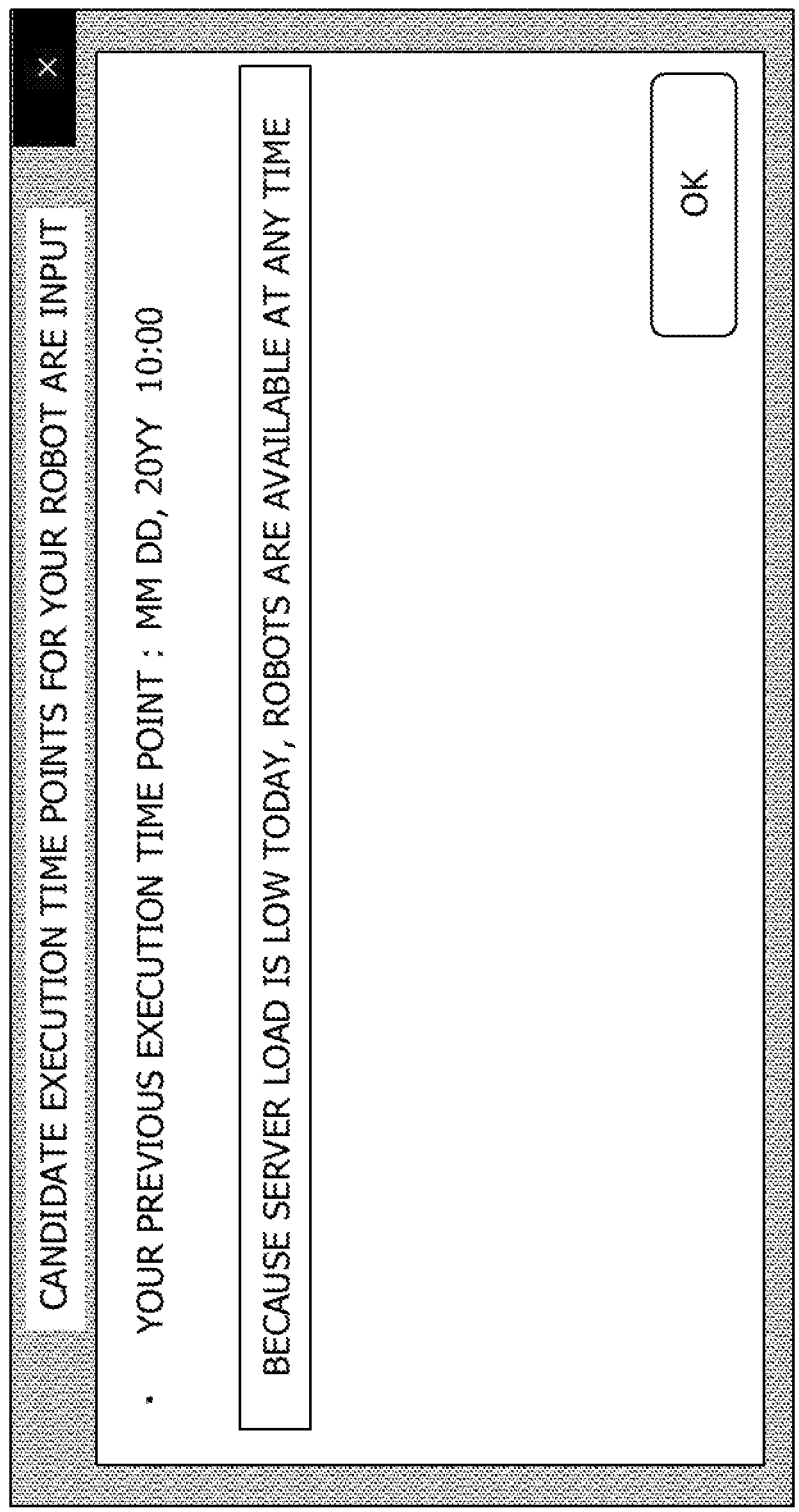
FIG. 13 illustrates an example of an output of a dialog when the server load is low in the control system illustrated in FIG. 1.

FIG. 13 illustrates an example of an output of a dialog when the server load is low in the control system 100 illustrated in FIG. 1.

In the example illustrated in FIG. 13, a message is displayed to the effect that, because of a low server load state, the manual execution robot 21 may be executed at any time.

The user references the dialog illustrated in FIG. 13 and causes the manual execution robot 21 to be executed in any time slot in which the load is low.

Figure 14:
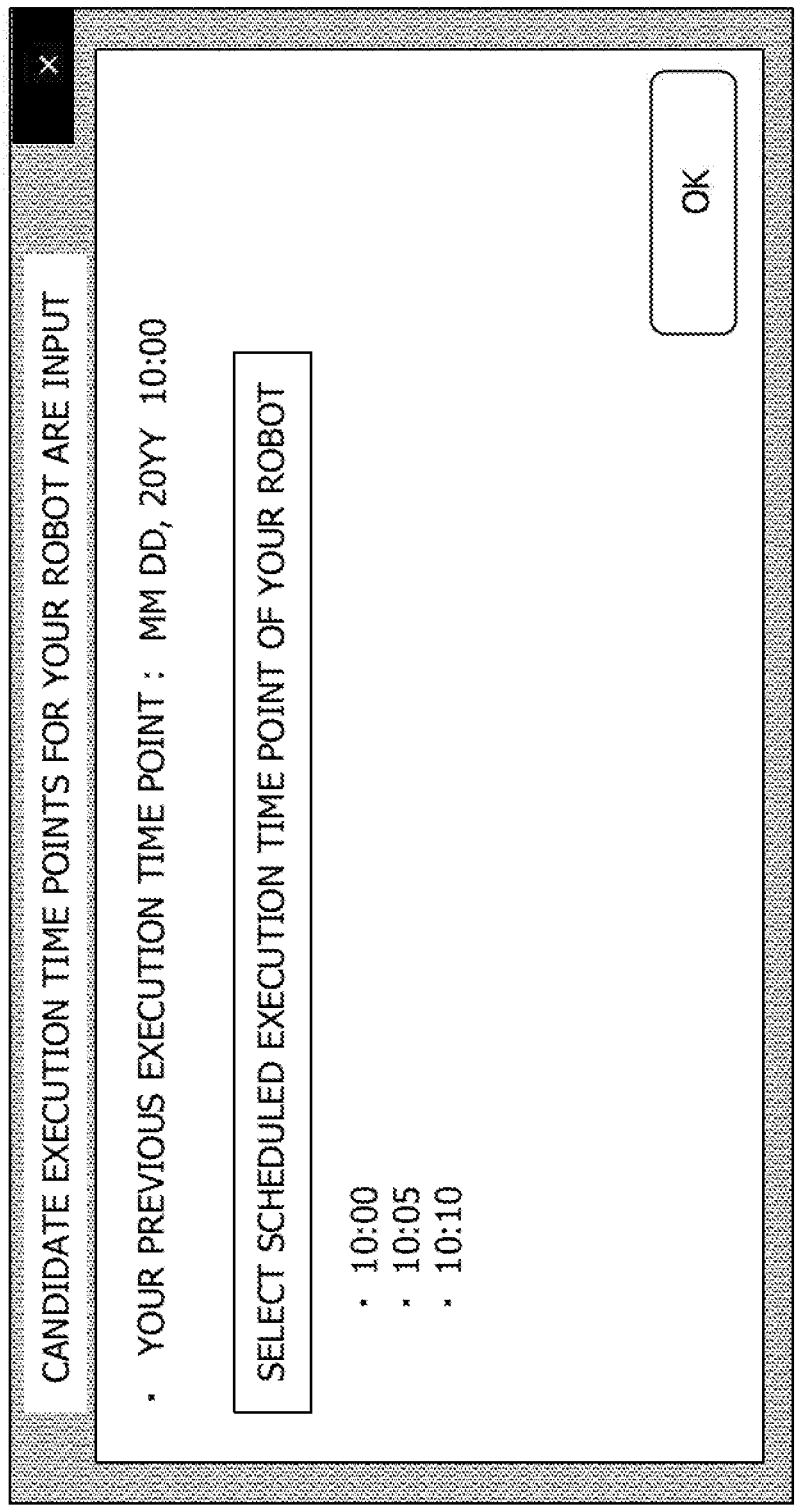
FIG. 14 illustrates an example of an output of a scheduled execution time point input dialog in the control system illustrated in FIG. 1.

FIG. 14 illustrates an example of an output of a scheduled execution time point input dialog in the control system 100 illustrated in FIG. 1.

When the "OK" button is pressed down in the warning dialog illustrated in FIG. 12, the scheduled execution time point input dialog illustrated in FIG. 14 may be displayed. The scheduled execution time point input dialog displays one or more (three in the illustrated example) candidate execution time points of the manual execution robot 21 in a time slot in which the server load state is relatively low.

The user selects a scheduled execution time point from the candidate execution time points by checking a checkbox in the scheduled execution time point input dialog.

The scheduled execution time point is not limited to a selection method as illustrated in FIG. 14, but may be input in such a way that the user inputs, into a textbox, any time point at which the server load is low.

When the scheduled execution time point input in the scheduled execution time point input dialog is transmitted to the server 1 and, as a result, the server load during the time slot selected by the user may become high, the server 1 may shift the execution time slot of the automatic execution robot 31.

[A-2] Operation Examples

Figure 15:
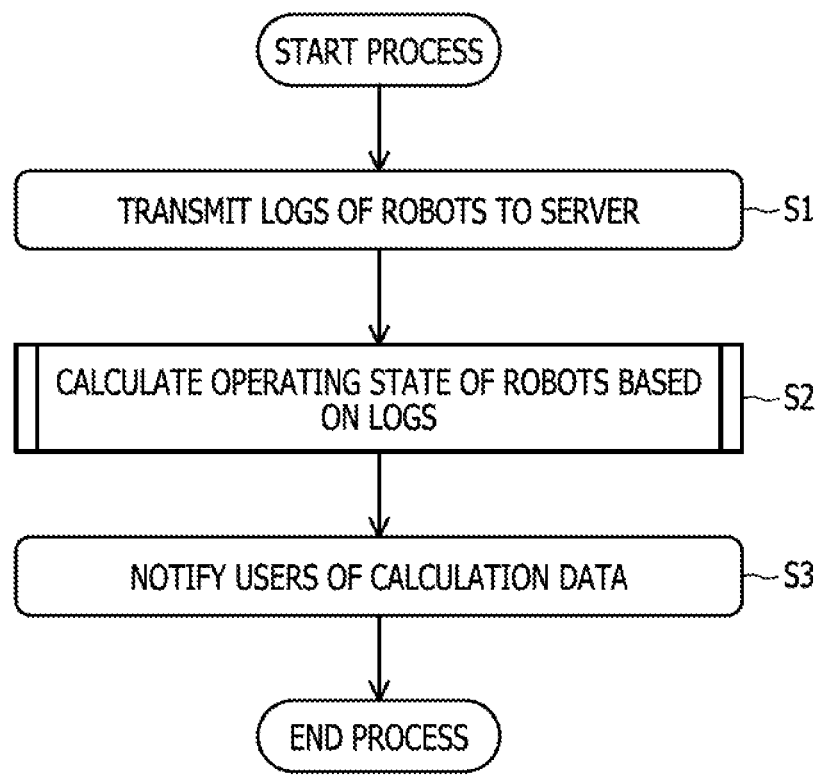
FIG. 15 is a flowchart for explaining a first example of a load balancing process in the control system illustrated in FIG. 1.

A first example of the load balancing process in the control system 100 illustrated in FIG. 1 will be described with reference to a flowchart (steps S1 to S3) illustrated in FIG. 15.

The user machines 2 and the VMs 3 transmit the logs 4 of the robots 21, 31 to the server 1 (step S1).

The server 1 calculates the operating state of the robots 21, 31 based on the logs 4 (step S2). The process of calculating the operating state of the robots 21, 31 in step S2 is described later in detail with reference to FIG. 16.

The server 1 notifies the users of data regarding the calculated operating state (step S3). The load balancing process is then complete.

Figure 16:
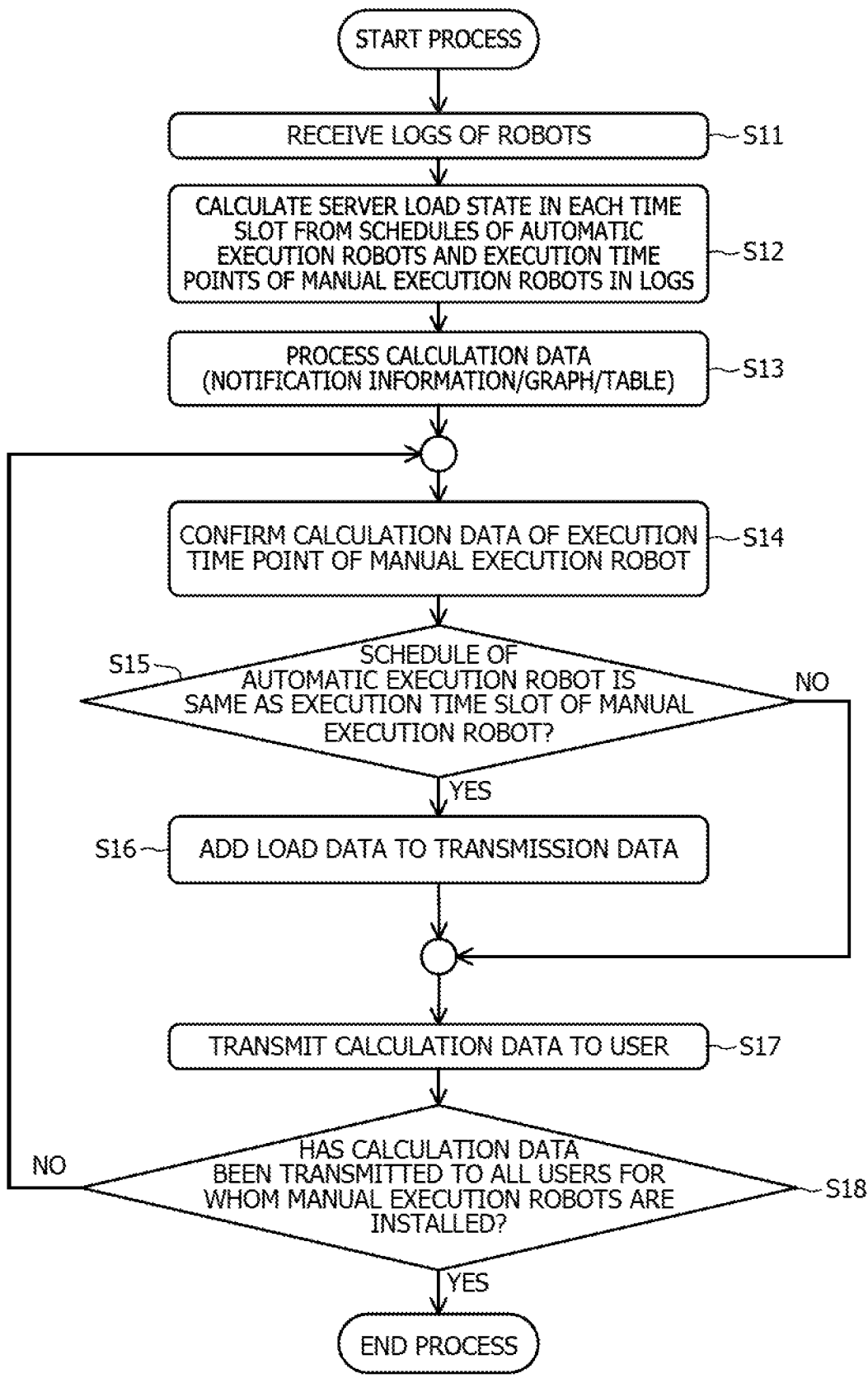
FIG. 16 is a flowchart for explaining details of a process of calculating an operating state of robots illustrated in FIG. 15.

Next, the process of calculating the operating state of the robots 21, 31 in the server 1 illustrated in FIG. 15 will be described in detail with reference to a flowchart (steps S11 to S18) illustrated in FIG. 16.

The log acquisition unit 111 receives the logs 4 of the robots 21, 31 (step S11).

The load calculation unit 112 calculates a server load state in each time slot based on the schedules of the automatic execution robots 31 and the execution time points of the manual execution robots 21 included in the logs 4 (step S12).

The load calculation unit 112 processes data information regarding the calculated server load state into notification information, a graph, a table, or the like (step S13).

The robot extraction unit 113 confirms the calculation data of the execution time point of the manual execution robot 21 (step S14).

The robot extraction unit 113 determines whether the schedule of the automatic execution robot 31 is the same as the execution time slot of the manual execution robot 21 (step S15).

If the schedule of the automatic execution robot 31 is not the same as the execution time slot of the manual execution robot 21 (refer to the NO route in step S15), the process proceeds to step S17.

If, however, the schedule of the automatic execution robot 31 is the same as the execution time slot of the manual execution robot 21 (refer to the YES route in step S15), the robot extraction unit 113 adds data regarding the load state to data to be transmitted to the user (step S16).

The information output unit 115 transmits the data regarding the calculated load state to the user (step S17).

The robot extraction unit 113 determines whether the data regarding the calculated load state has been transmitted to all the users for whom the manual execution robots 21 are installed (step S18).

If there is still a user to whom the data regarding the load state has not been transmitted (refer to the NO route in step S18), the process returns to step S14.

If, however, the data regarding the load state has been transmitted to all the users (refer to the YES route in step S18), the process of calculating the operating state of the robots 21, 31 is complete.

Figure 17:
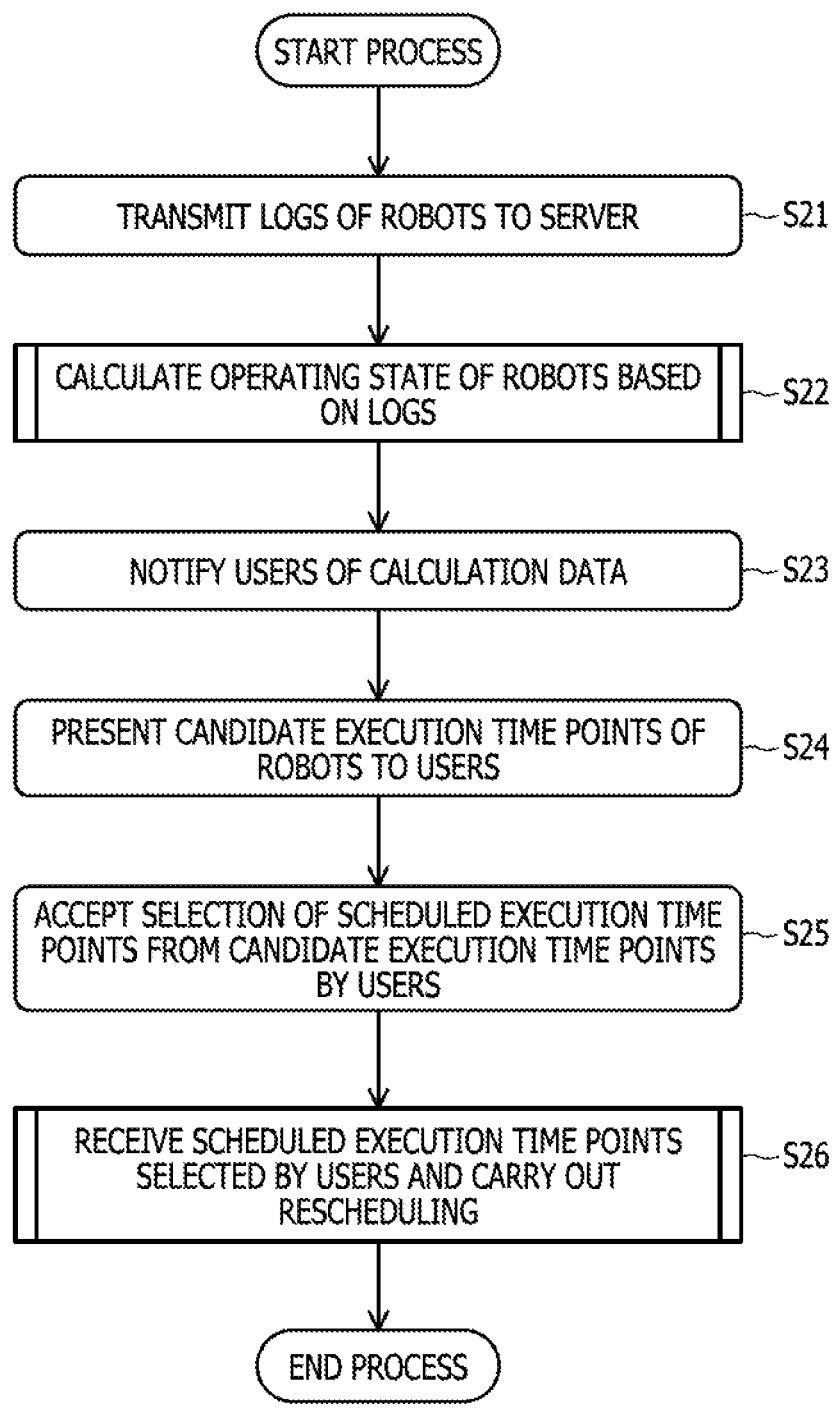
FIG. 17 is a flowchart for explaining a second example of the load balancing process in the control system illustrated in FIG. 1.

Next, a second example of the load balancing process in the control system 100 illustrated in FIG. 1 will be described with reference to a flowchart (steps S21 to S26) illustrated in FIG. 17.

The user machines 2 and the VMs 3 transmit the logs 4 of the robots 21, 31 to the server 1 (step S21).

The server 1 calculates the operating state of the robots 21, 31 based on the logs 4 (step S22). The process of calculating the operating state of the robots 21, 31 in step S22 is described later in detail with reference to FIG. 18.

The server 1 notifies the users of data regarding the calculated operating state (step S23).

The user machines 2 present candidate execution time points of the manual execution robots 21 to the users (step S24).

The user machines 2 accept selection of scheduled execution time points from the candidate execution time points by the users (step S25).

The server 1 receives the scheduled execution time points selected by the users and carries out rescheduling of execution time points of the automatic execution robots 31 (step S26). The rescheduling of execution time points of the automatic execution robots 31 in step S26 is described later in detail with reference to FIG. 19.

Figure 18:
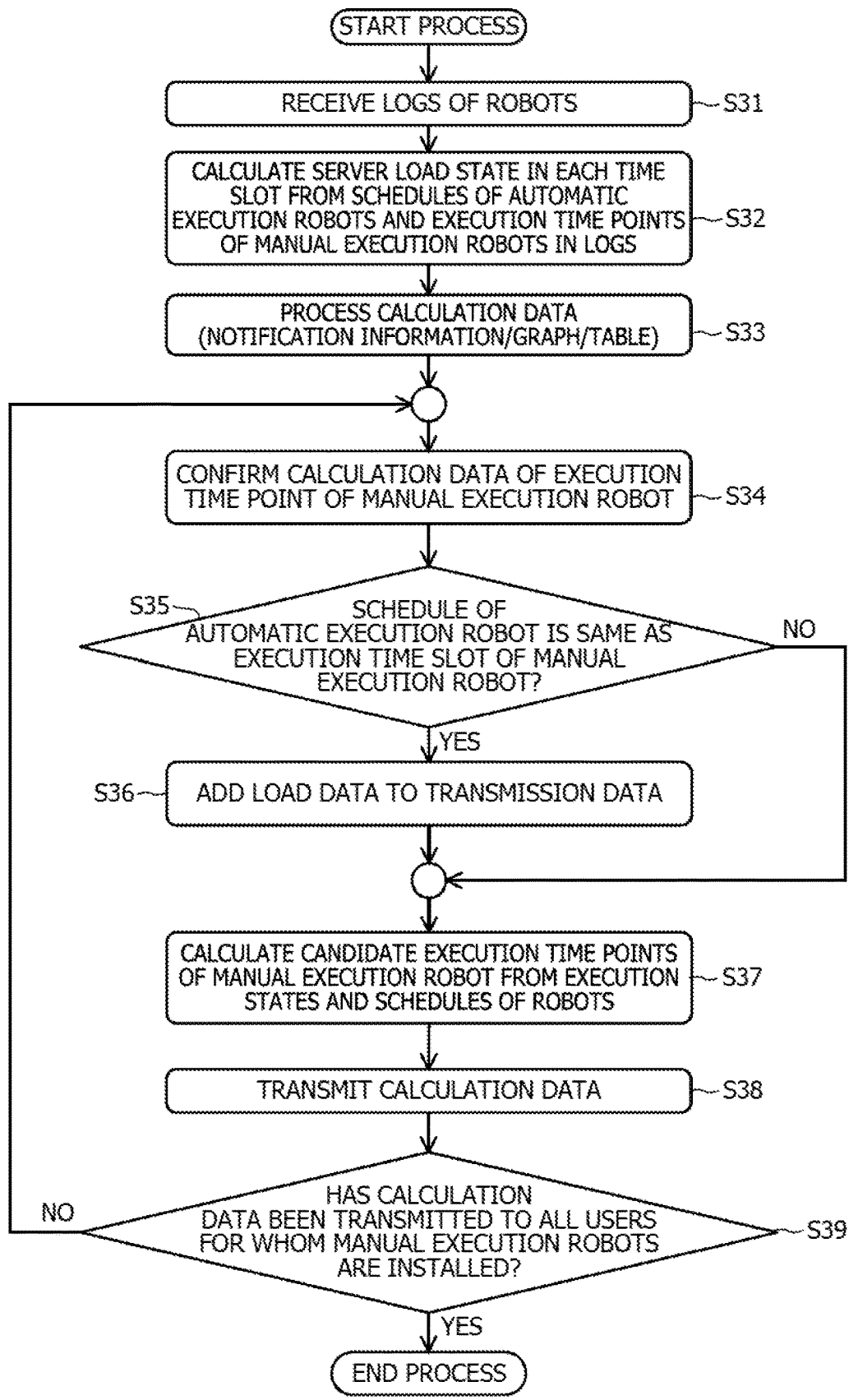
FIG. 18 is a flowchart for explaining details of a process of calculating an operating state of robots illustrated in FIG. 17.

Next, the process of calculating the operating state of the robots 21, 31 in the server 1 illustrated in FIG. 17 will be described in detail with reference to a flowchart (steps S31 to S39) illustrated in FIG. 18.

The log acquisition unit 111 receives the logs 4 of the robots 21, 31 (step S31).

The load calculation unit 112 calculates a server load state in each time slot based on the schedules of the automatic execution robots 31 and the execution time points of the manual execution robots 21 included in the logs 4 (step S32).

The load calculation unit 112 processes data information regarding the calculated server load state into notification information, a graph, a table, or the like (step S33).

The robot extraction unit 113 confirms the calculation data of the execution time point of the manual execution robot 21 (step S34).

The robot extraction unit 113 determines whether the schedule of the automatic execution robot 31 is the same as the execution time slot of the manual execution robot 21 (step S35).

If the schedule of the automatic execution robot 31 is not the same as the execution time slot of the manual execution robot 21 (refer to the NO route in step S35), the process proceeds to step S37.

If, however, the schedule of the automatic execution robot 31 is the same as the execution time slot of the manual execution robot 21 (refer to the YES route in step S35), the robot extraction unit 113 adds data regarding the load state to data to be transmitted to the user (step S36).

The load calculation unit 112 calculates candidate execution time points of the manual execution robot 21 from the execution states and schedules of the robots 21, 31 (step S37).

The information output unit 115 transmits the data regarding the calculated load state to the user (step S38).

The robot extraction unit 113 determines whether the data regarding the calculated load state has been transmitted to all the users for whom the manual execution robots 21 are installed (step S39).

If there is still a user to whom the data regarding the load state has not been transmitted (refer to the NO route in step S39), the process returns to step S34.

If, however, the data regarding the load state has been transmitted to all the users (refer to the YES route in step S39), the process of calculating the operating state of the robots 21, 31 is complete.

Figure 19:
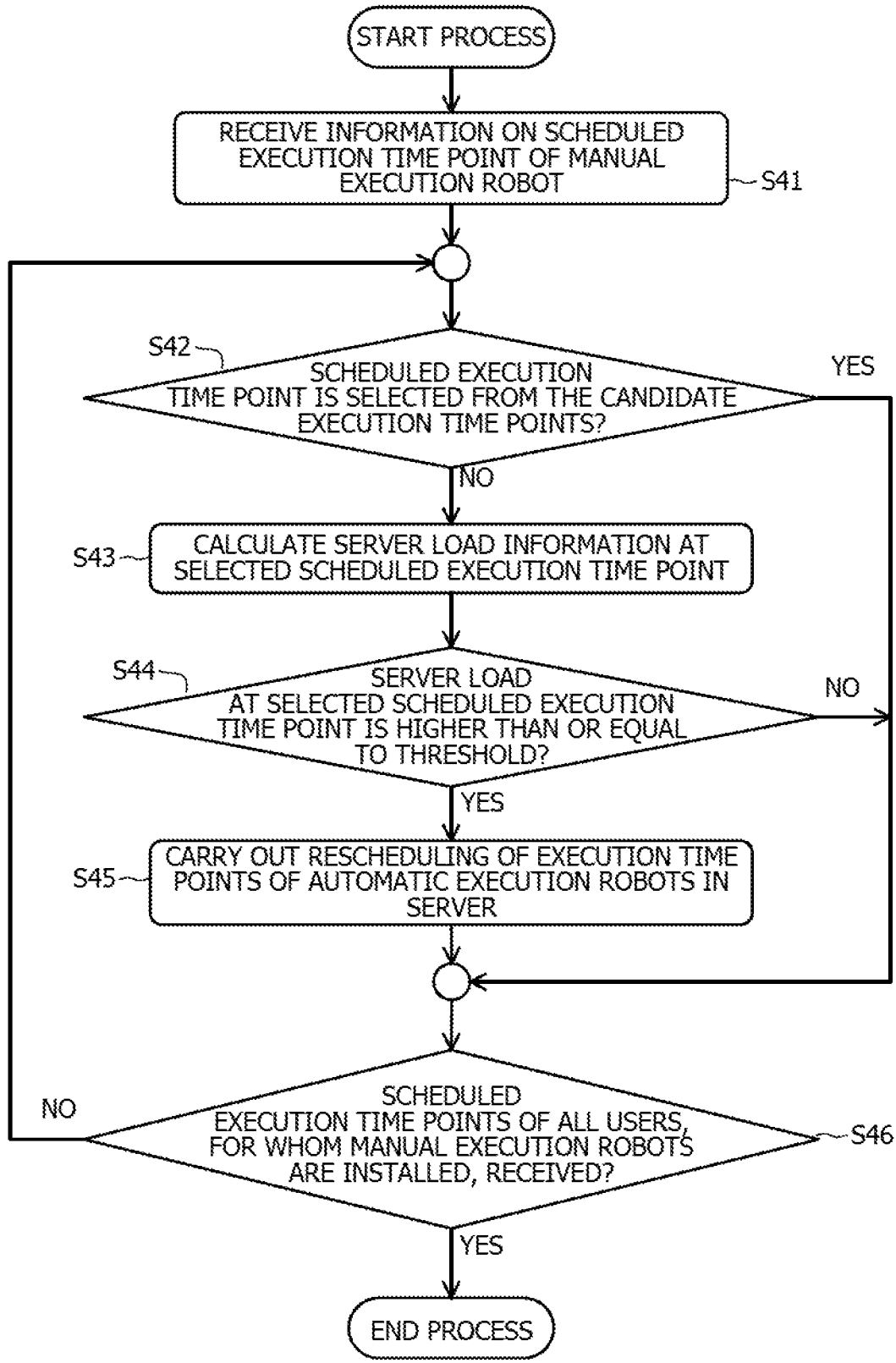
FIG. 19 is a flowchart for explaining details of a process of rescheduling execution time points of automatic execution robots illustrated in FIG. 17.

Next, the process of rescheduling execution time points of the automatic execution robots 31 illustrated in FIG. 17 will be described in detail with reference to a flowchart (steps S41 to S46) illustrated in FIG. 19.

The load calculation unit 112 receives information on a scheduled execution time point of the manual execution robot 21 (step S41).

The load calculation unit 112 determines whether the scheduled execution time point is selected from the candidate execution time points (step S42).

If the scheduled execution time point is selected from the candidate execution time points (refer to the YES route in step S42), the process proceeds to step S46.

If, however, the scheduled execution time point is not selected from the candidate execution time points (refer to the NO route in step S42), the load calculation unit 112 calculates server load information at the selected scheduled execution time point (step S43).

The time changing unit 114 determines whether the server load at the selected scheduled execution time point is higher than or equal to a threshold (step S44).

If the server load at the selected scheduled execution time point is lower than the threshold (refer to the NO route in step S44), the process proceeds to step S46.

If, however, the server load at the selected scheduled execution time point is higher than or equal to the threshold (refer to the YES route in step S44), the time changing unit 114 carries out rescheduling of execution time points of the automatic execution robots 31 (step S45).

The load calculation unit 112 determines whether the scheduled execution time points of all the users for whom the manual execution robots 21 are installed have been received (step S46).

If there is still a user whose scheduled execution time point has not been received (refer to the NO route in step S46), the process returns to step S42.

If, however, the scheduled execution time points of all the users have been received (refer to the YES route in step S46), the process of rescheduling execution time points of the automatic execution robots 31 is complete.

[A-3] Advantages

According to the control program, the control apparatus, and the control method in the example of the embodiment described above, for example, the following operations and advantages may be achieved.

The log acquisition unit 111 acquires information in the logs 4 regarding the operating state of a plurality of robots 21, 31. Based on the acquired information in the logs 4, the load calculation unit 112 calculates a first load in each time slot related to control of the plurality of robots 21, 31. When there is a first time slot in which the first load is higher than or equal to a first threshold, the robot extraction unit 113 extracts the robot 21, 31 that performs a first task, from the plurality of robots 21, 31, in the first time slot. The time changing unit 114 changes a time slot for operating the extracted robot 21, 31.

Therefore, the load related to the server 1 that performs a control process of the plurality of robots 21, 31 may be temporally distributed. The number of robots 21, 31 that are able to be deployed on the control system 100 may be increased, and management of many robots 21, 31 may be made easier.

The robot extraction unit 113 determines the first task depending on whether a task is performed by a user who uses the robot 21, 31. The time changing unit 114 changes the time slot for operating the extracted robot 21, 31 to the second time slot in which the first load is lowest.

Therefore, the execution time point of the manual execution robot 21, which is arbitrarily executed by the user, may be set in a low-load time slot.

The load calculation unit 112 calculates the second load in the second time slot when a change to the second time slot is made. The time changing unit 114 determines, depending on the calculated second load, whether to execute changing of the time slot for operating the robot 21, 31.

Therefore, even when the scheduled execution time point selected by the user is in a high-load time slot, the execution time slot of the automatic execution robot 31 may be changed.

When the second load is in a certain state, the information output unit 115 outputs information on a load in at least a partial time slot included in each time slot.

This allows the user to grasp a low-load time slot.

[B] Others

The techniques disclosed herein are not limited to the foregoing embodiment and may be variously modified and changed without departing from the gist of the present embodiment. The configurations and processes described in the present embodiment may be selected as desired or may be combined as appropriate.

[C] Appendix

The following appendices are disclosed regarding the above embodiment.

Appendix 1

A control program for causing a computer that controls operations of a plurality of robots to execute a process, the process comprising:
acquiring information in a log regarding an operating state of the plurality of robots;
based on the acquired information in the log, calculating a first load in each time slot related to control of the plurality of robots;
when there is a first time slot in which the first load is higher than or equal to a first threshold, extracting a robot that performs a first task, from the plurality of robots, in the first time slot; and
changing a time slot for operating the extracted robot.

Appendix 2

The control program according to appendix 1, wherein the extracting a robot includes determining the first task depending on whether a task is performed by a user who uses the robot.

Appendix 3

The control program according to appendix 1 or 2, wherein the changing includes changing a time slot for operating the extracted robot to a second time slot in which the first load is lowest.

Appendix 4

The control program according to appendix 3, wherein
the calculating includes calculating a second load in the second time slot when a change to the second time slot is made, and
the changing the time slot includes determining, depending on the calculated second load, whether to execute the changing.

Appendix 5

The control program according to appendix 4, the process further comprising:
outputting information on a load in at least a partial time slot included in the time slot, when the second load is in a certain state.

Appendix 6

A control apparatus that controls operations of a plurality of robots, comprising:
a log acquisition unit that acquires information in a log regarding an operating state of the plurality of robots;
a load calculation unit that, based on the acquired information in the log, calculates a first load in each time slot related to control of the plurality of robots;

a robot extraction unit that, when there is a first time slot in which the first load is higher than or equal to a first threshold, extracts a robot that performs a first task, from the plurality of robots, in the first time slot; and a time changing unit that changes a time slot for operating the extracted robot.

Appendix 7

The control apparatus according to appendix 6, wherein the robot extraction unit determines the first task depending on whether a task is performed by a user who uses the robot.

Appendix 8

The control apparatus according to appendix 6 or 7, wherein the time changing unit changes the time slot for operating the extracted robot to a second time slot in which the first load is lowest.

Appendix 9

The control apparatus according to appendix 8, wherein
the load calculation unit calculates a second load in the second time slot when a change to the second time slot is made, and
the time changing unit determines, depending on the calculated second load, whether to execute the changing.

Appendix 10

The control apparatus according to appendix 9, further comprising an information output unit that outputs information on a load in at least a partial time slot included in the time slot, when the second load is in a certain state.

Appendix 11

A control method for controlling operations of a plurality of robots, comprising:
acquiring information in a log regarding an operating state of the plurality of robots;
based on the acquired information in the log, calculating a first load in each time slot related to control of the plurality of robots;
when there is a first time slot in which the first load is higher than or equal to a first threshold, extracting a robot that performs a first task, from the plurality of robots, in the first time slot; and
changing a time slot for operating the extracted robot.

Appendix 12

The control method according to appendix 11, wherein the extracting a robot includes determining the first task depending on whether a task is performed by a user who uses the robot.

Appendix 13

The control method according to appendix 11 or 12, wherein the changing includes changing a time slot for operating the extracted robot to a second time slot in which the first load is lowest.

Appendix 14

The control method according to appendix 13, wherein
the calculating includes calculating a second load in the second time slot when a change to the second time slot is made, and
the changing includes determining, depending on the calculated second load, whether to execute the changing.

Appendix 15

The control method according to appendix 14, further comprising outputting information on a load in at least a partial time slot included in the time slot, when the second load is in a certain state.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    acquiring information in a log regarding an operating state of a plurality of robots;
    based on the acquired information in the log, calculating a first load in each of a plurality of time slots related to control of the plurality of robots;
    with a first time slot in which the first load being higher than or equal to a first threshold,
        specifying robots that perform a first task in the first time slot from the plurality of robots, the robots to be specified including a manual execution robot and an automatic execution robot, a time slot in which the manual execution robot performs the first task being determined based on an operation by a user who uses the manual execution robot, a time slot in which the automatic execution robot performs the first task being determined based on a certain task schedule,
        changing the certain task schedule so that the automatic execution robot performs the first task in a second time slot, and
        calculating a second load in the second time slot; and
    with the second load being higher than or equal to the first threshold,
        displaying at least one of a candidate execution time and the first load in each of the plurality of time slots, the candidate execution time being a time slot in the plurality of time slots having the first load that is less than the first load for the first time slot,
        receiving at least one of a user-specified time slot and a user-selection of the candidate execution time, the user-specified time slot being at least one time slot in the plurality of time slots having the first load that is less than the first load for the first time slot, and
        determining the time slot in which the manual execution robot performs the first task to be the at least one of the user-specified time slot and the user-selection of the candidate execution time.

2. The non-transitory computer-readable storage medium according to claim 1, wherein the process further comprises determining the first task depending on whether a task is performed by the user.

3. The non-transitory computer-readable storage medium to claim 1, wherein the time slot for operating the specified robots are changed to another time slot in which the first load is lowest.

4. The non-transitory computer-readable storage medium according to claim 3, wherein the process further comprises outputting, when the second load is in a certain state, information on a load in at least a partial time slot selected from a partial time slot included in the first time slot and a partial time slot included in the another time slot.

5. A control apparatus, comprising:
a memory; and
a processor coupled to the memory and configured to:
acquire information in a log regarding an operating state of a plurality of robots;
based on the acquired information in the log, calculate a first load in each of a plurality of time slots related to control of the plurality of robots;
with a first time slot in which the first load being higher than or equal to a first threshold,
specify robots that perform a first task in the first time slot from the plurality of robots, the robots to be specified including a manual execution robot and an automatic execution robot, a time slot in which the manual execution robot performs the first task being determined based on an operation by a user who uses the manual execution robot, a time slot in which the automatic execution robot performs the first task being determined based on a certain task schedule,
change the certain task schedule so that the automatic execution robot performs the first task in a second time slot, and
calculate a second load in the second time slot; and
with the second load being higher than or equal to the first threshold,
display at least one of a candidate execution time and the first load in each of the plurality of time slots, the candidate execution time being a time slot in the plurality of time slots having the first load that is less than the first load for the first time slot, and
receive at least one of a user-specified time slot and a user-selection of the candidate execution time, the user-specified time slot being at least one time slot in the plurality of time slots having the first load that is less than the first load for the first time slot, and
determine the time slot in which the manual execution robot performs the first task to be the at least one of the user-specified time slot and the user-selection of the candidate execution time.

6. The control apparatus according to claim 5, wherein the processor is configured to determine the first task depending on whether a task is performed by the user.

7. The control apparatus according to claim 5, wherein the processor is configured to change the time slot for operating the specified robots to another time slot in which the first load is lowest.

8. The control apparatus according to claim 5, wherein the processor is configured to output, when the second load is in a certain state, information on a load in at least a partial time slot selected from a partial time slot included in the first time slot and a partial time slot included in the another time slot.

9. A control method executed by a computer, comprising:
acquiring information in a log regarding an operating state of a plurality of robots;
based on the acquired information in the log, calculating a first load in each of a plurality of time slots related to control of the plurality of robots;
with a first time slot in which the first load being higher than or equal to a first threshold,
specifying robots that perform a first task in the first time slot from the plurality of robots, the robots to be specified including a manual execution robot and an automatic execution robot, a time slot in which the manual execution robot performs the first task being determined based on operation by a user who uses the manual execution robot, a time slot in which the automatic execution robot performs the first task being determined based on a certain task schedule,
changing the certain task schedule so that the automatic execution robot performs the first task in a second time slot, and
calculating a second load in the second time slot; and
with the second load being higher than or equal to the first threshold,
displaying at least one of a candidate execution time and the first load in each of the plurality of time slots, the candidate execution time being a time slot in the plurality of time slots having the first load that is less than the first load for the first time slot, and
receiving at least one of a user-specified time slot and a user-selection of the candidate execution time, the user-specified time slot being at least one time slot in the plurality of time slots having the first load that is less than the first load for the first time slot, and
determining the time slot in which the manual execution robot performs the first task to be the at least one of the user-specified time slot and the user-selection of the candidate execution time.

* * * * *